United States Patent [19]

Kojima et al.

[11] 3,739,254

[45] June 12, 1973

[54] VOLTAGE MULTIPLYING RECTIFIER DEVICE

[75] Inventors: Isao Kojima; Tetsuya Takahashi; Takeshi Sasaki; Tatuwo Yosimura, all of Hitachi, Japan

[73] Assignee: Hitachi, Ltd., Tokyo, Japan

[22] Filed: Dec. 21, 1971

[21] Appl. No.: 210,527

[30] Foreign Application Priority Data

Dec. 29, 1970 Japan .............................. 45/128560

[52] U.S. Cl. ............................... 321/15, 174/52 PE

[51] Int. Cl. ............................................ H02m 7/00

[58] Field of Search ................................ 321/8, 15; 174/52 PE

[56] References Cited

UNITED STATES PATENTS

| | | | |
|---|---|---|---|
| 2,985,812 | 5/1961 | Peterson | 321/15 |
| 2,743,308 | 4/1956 | Bardsley | 174/52 PE |
| 2,758,261 | 8/1956 | Armstrong et al. | 174/52 PE |
| 3,376,494 | 4/1968 | Wilkinson | 321/45 |
| 3,418,541 | 12/1968 | Adams | 317/156 |

*Primary Examiner*—William M. Shoop, Jr.
*Attorney*—Craig, Antonelli & Hill

[57] ABSTRACT

A voltage multiplying rectifier device for use as a high voltage power supply for a cathode-ray tube in a television receiver in which silicon rectifier elements are used for rectifying the high voltage.

16 Claims, 16 Drawing Figures

FIG.(b)

VOLTAGE MULTIPLYING RECTIFIER DEVICE

BACKGROUND OF THE INVENTION

1. Field of the Invention

This invention relates to a voltage multiplying rectifier device employing a plurality of silicon rectifier elements.

2. Description of the Prior Art

The use of high voltage rectifier elements of silicon in a voltage multiplying rectifier device for use as a high voltage power supply for television receivers has generally been undesirable in that noise appears on the picture screen of the cathode-ray tube thereby extremely adversely affecting the quality of the televised picture being viewed.

SUMMARY OF THE INVENTION

It is an object of the present invention to provide a novel and improved voltage multiplying rectifier device for use as a high voltage power supply for a cathode-ray tube in a television receiver in which a plurality of silicon rectifier elements are used for rectifying the high voltage.

Another object of the present invention is to provide a voltage multiplying rectifier device which is free from the adverse effect imparted to the interior and exterior of a television receiver due to the noise produced as a result of the use of silicon rectifier elements.

A further object of the present invention is to provide a voltage multiplying rectifier device in which silicon rectifier elements are used for the purpose of miniaturizing and improving the performance of the high voltage rectifier means.

DESCRIPTION OF THE PREFERRED EMBODIMENT

With the tendency towards employment of solid state circuits in television receivers, voltage multiplying rectifier devices consisting of a plurality of semiconductor high voltage rectifier elements and associated capacitors are generally used in the high voltage circuit or high voltage power supply for the electron acceleration in the cathode-ray tube. The voltage multiplying rectifier devices include voltage doubling, triplicating, quadruplicating and quintuplicating rectifier devices, but herein a voltage triplicating rectifier device will be taken as an example of such devices so that the present invention can be more easily understood.

Figure 1:
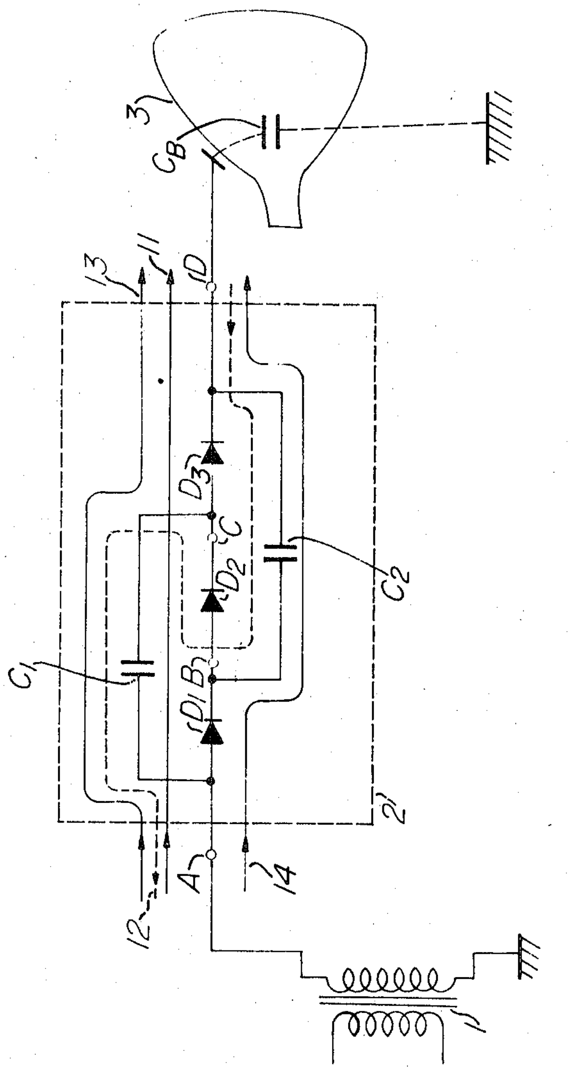
FIG. 1 is an electrical connection diagram of a high voltage circuit in a television receiver to which the present invention is applied.

Referring to FIG. 1 showing the structure of a high voltage circuit in a television receiver employing a voltage triplicating rectifier device, the voltage triplicating rectifier device 2 is connected to the a.c. terminal A of a flyback transformer 1, and a cathode-ray tube 3 is connected to the d.c. terminal D of the voltage triplicating rectifier device 2. The earth capacity of the cathode-ray tube 3 is designated by the character $C_B$.

The voltage triplicating rectifier device 2 is composed of three semiconductor rectifiers $D_1$, $D_2$ and $D_3$, a voltage dividing capacitor $C_1$ connected in parallel with the rectifiers $D_1$ and $D_2$ between points A and C, and another voltage dividing capacitor $C_2$ connected in parallel with the rectifiers $D_2$ and $D_3$ between points B and D. The flyback transformer 1 delivers an output voltage of sinusoidal waveform having a peak value of E volts, and a high voltage at 3E volts is applied to the cathode-ray tube 3.

The high voltage rectifiers conventionally used in this voltage multiplying rectifier device are in the form of a selenium rectifier which is made by holding a plurality of selenium rectifier elements between a pair of electrodes and covering the assembly with a molded resin block or inserting the assembly in a sleeve of electrical insulation. However, due to the fact that the selenium rectifier element has a low breakdown voltage, hundreds of selenium rectifier elements must be laminated in order to obtain the required breakdown voltage and thus a complex manufacturing process is required. Further, the selenium rectifier of such a construction is quite large in size which provides a hindrance to the miniaturization of the parts of a television receiver. With the increased demand for color television receivers and with the tendency toward the use of large-diameter and wide-angle cathode-ray tubes, the voltage and current capacity of the rectifier device has been increased more and more and a higher critical operating temperature has also been demanded. However, the selenium rectifier cannot easily meet the specifications because the critical operating temperature is quite low.

The use of a silicon rectifier in the voltage multiplying rectifier device can obviate the above drawbacks in that its critical operating temperature is high and a single silicon rectifier element has a breakdown voltage which is several tens of times that of the selenium rectifier element. However, as is well known, the flow of a reverse recovery current occurs in a silicon rectifier when a reverse voltage is applied thereto in the forward direction, thereby generating noise waves. It has been feared that the noise waves may impart an external disturbance to the synchronizing circuit in the television receiver or may be radiated externally from the receiver thereby adversely affecting the operation of other electric apparatus. Therefore, suitable means for preventing the radiation of undesirable noise waves have been required for conventional high voltage rectifier devices employing silicon rectifiers. In an effort to overcome the above trouble, the inventors have investigated the cause of radiation of such noise waves and succeeded in eliminating the radiation by employing silicon rectifiers or rectifier elements having unique operating characteristics.

The process of radiation of the noise waves in the voltage triplicating rectifier device will be described with reference to FIGS. 1 and 2. Referring to FIGS. 1 and 2, the high voltage rectifier elements $D_1$, $D_2$ and $D_3$ conduct in response to the application of a positive pulse voltage Es(+) from the terminal A of the flyback transformer 1 to the voltage triplicating rectifier device 2, and charging current flows by way of a route 11 shown by the solid line thereby charging the earth capacity $C_B$ of the cathode-ray tube 3 to the peak value Es(+). Then, when the negative pulse voltage Es(−) is applied to the rectifier device 2, the second rectifier element $D_2$ conducts solely and charging current flows by way of a route 12 shown by the dotted line so that the voltage [ Es(+) + Es(−) ] is applied across the capacitors $C_1$ and $C_2$. Thus, the capacitors $C_1$ and $C_2$ are each charged with the voltage which is ½ [ Es(+) + Es(−) ]. In response to the subsequent application of the positive pulse voltage Es(+) to the rectifier device 2, the first and third rectifier elements $D_1$ and $D_3$ conduct thereby charging the earth capacity $C_B$ of the cathode-ray tube 3 by way of a route 14 shown by the solid line. At this time, the earth capacity $C_B$ is charged up to the voltage ½ [ Es(+) + Es(−) ] + Es(+). The above operation is repeated until finally the earth capacity $C_B$ is charged up to the voltage [ 2Es(+) + Es(−) ].

Figure 2A:
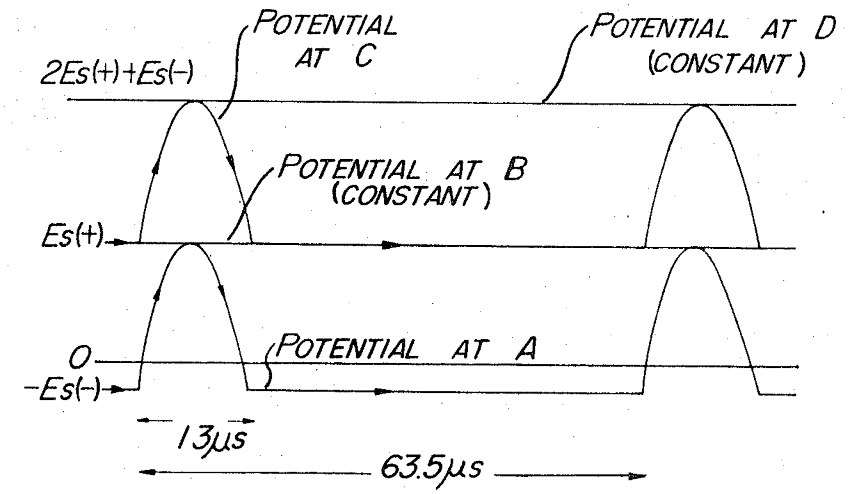
FIGS. 2 and 3 show voltage and current waveforms for illustrating the operation of the high voltage rectifier elements in the voltage multiplying rectifier device shown in FIG. 1.
Figure 2B:
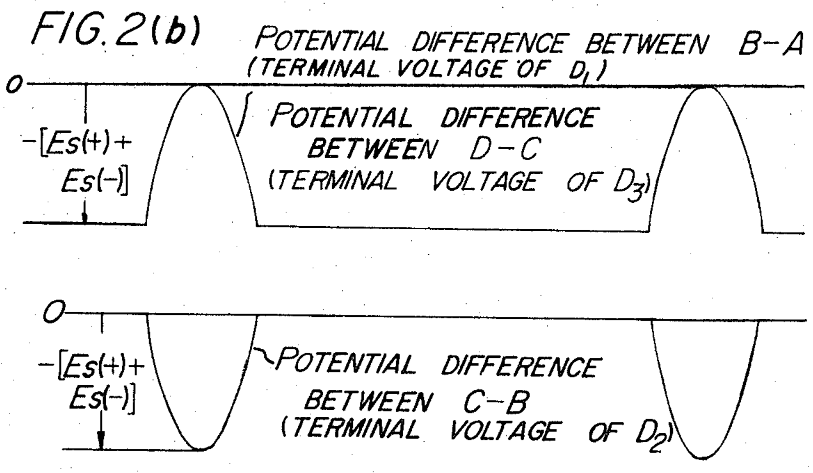

The potentials at the points A, B, C and D will now be discussed. The potentials at the points A and C vary depending on the pulse voltage applied from the flyback transformer 1 as seen in FIG. 2*a* and the peak values with respect to ground are Es(+) and [2 Es(+) + Es(−) ] respectively. On the other hand, the potentials at the points B and D on the d.c. side are substantially free from variations except a slight ripple voltage and are maintained substantially at Es(+) and ] 2 Es(+) + Es(−) ] respectively. Therefore, the potential difference between the points B and A (terminal voltage of the rectifier element $D_1$), the potential difference between the points D and C (terminal voltage of the rectifier element $D_3$), and the potential difference between the points C and B (terminal voltage of the rectifier element $D_2$) are as seen in FIG. 2*b*.

Figures 3A, 3B, 3C, 3D, 3E, 3F:
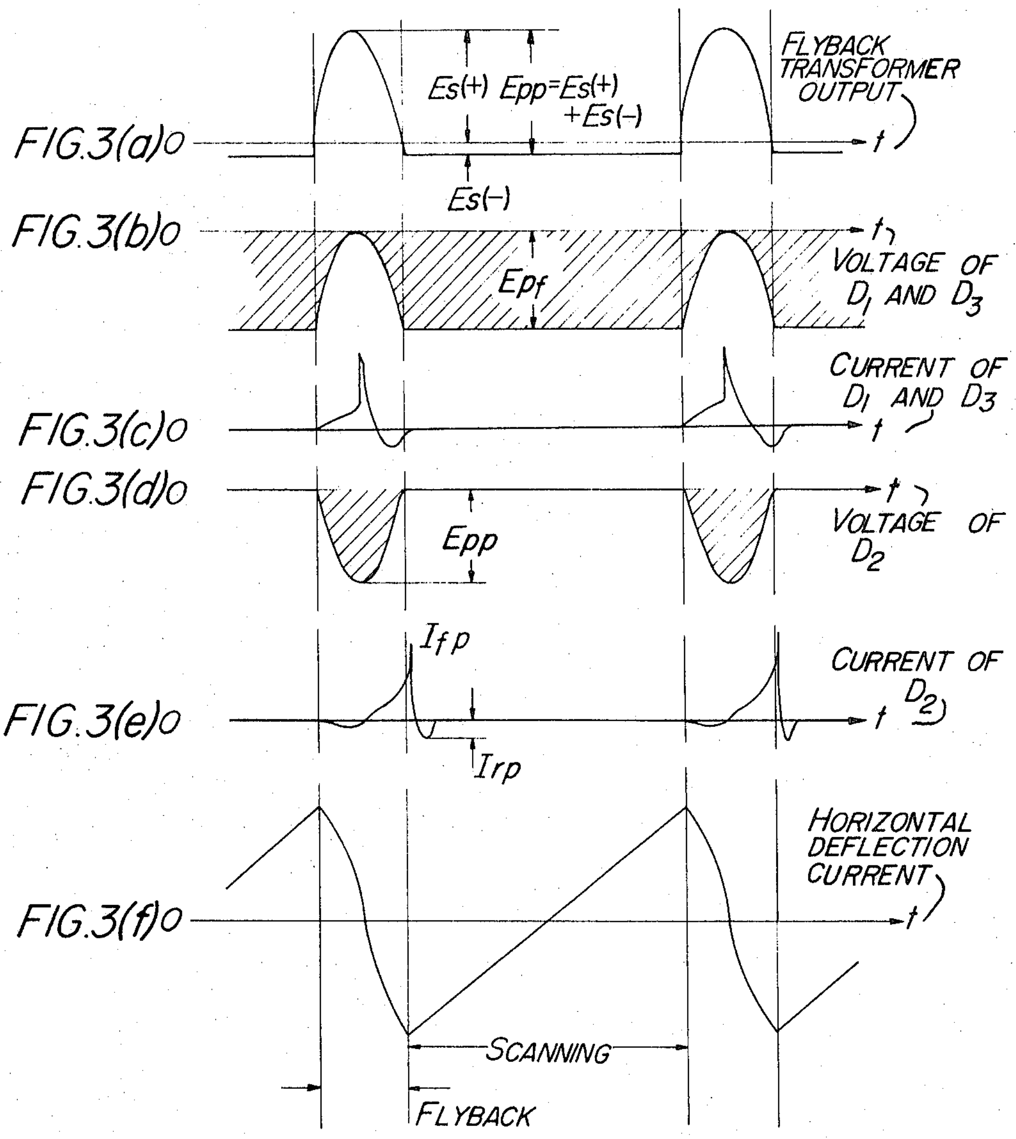

The terminal voltages and currents of these rectifier elements $D_1$, $D_2$ and $D_3$ and the current supplied to the horizontal deflection yoke are plotted on the same time axis as shown in FIG. 3. It will be apparent from FIGS. 3*c* and 3*e* that the current waveform in the case of the second rectifier element $D_2$ differs in phase from those in the case of the first and third rectifier elements $D_1$ and $D_3$. More precisely, in the case of the first and third rectifier elements $D_1$ and $D_3$, the peak of forward current appears at a position substantially centrally of the flyback time as seen in FIG. 3*c*. On the other hand, in the case of the second rectifier element $D_2$, the range in which the peak $I_{fp}$ of forward current appears and is followed by the peak $I_{rp}$ of reverse recovery current overlaps the starting point of the horizontal scanning period as seen in FIGS. 3*e* and 3*f*, and this has resulted in the radiation of noise waves producing black stripes on the phosphor screen of the cathode-ray tube. This phenomenon occurs more markedly especially in an area where radio waves are weak. Commonly, strong noise waves are objectionable in that an undesirable external disturbance may be imparted to the synchronizing circuit in the television receiver or noise waves may be radiated externally from the television receiver beside the fact that the black stripes are produced on the phosphor screen of the cathode-ray tube. However, the external disturbance and the radiation of noise waves are encountered only when the noise waves have a substantial intensity, and these troubles can be entirely eliminated by suppressing the noise to such an extent as to prevent appearance of the black stripes on the phosphor screen of the cathode-ray tube. The noise waves attributable to the first and third rectifier elements $D_1$ and $D_3$ offer no problem due to the fact that the peak of current shown in FIG. 3*c* lies in the flyback time of horizontal sweep by the horizontal deflection current as shown in FIG. 3*f* and that it lies in the period in which the high voltage is produced by the flyback transformer 1.

The present invention, which is based on the finding above described, provides a voltage multiplying rectifier device for supplying a high voltage to a cathode-ray tube comprising at least three semiconductor rectifiers connected in series between the output terminal of a flyback transformer and the high voltage terminal of the cathode-ray tube, a first voltage dividing capacitor connected in parallel with the two consecutive rectifiers counting from one end of the array of said series-connected rectifiers, and a second voltage dividing capacitor connected in parallel with the two consecutive rectifiers counting from the other end of the array of said series-connected rectifiers, wherein the even-numbered or second rectifier counting from the end connected to said flyback transformer has an improved reverse recovery characteristic over that of the odd-numbered or first and third rectifiers.

An embodiment of the present invention will now be described with reference to the drawing. A voltage multiplying rectifier device according to the present invention comprises three high voltage rectifier elements $D_1$, $D_2$ and $D_3$ connected in series, and the second rectifier element $D_2$ has a better reverse recovery characteristic than that of the first and third rectifier elements $D_1$ and $D_3$. More precisely, the reverse recovery time and reverse recovery current of the second rectifier element $D_2$ are less than those of the first and third rectifier elements $D_1$ and $D_3$.

Figure 4:
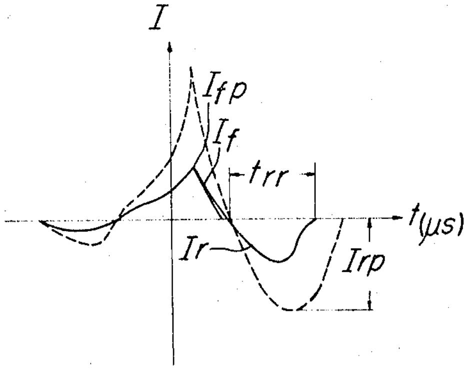
FIG. 4 shows a current waveform for illustrating the operation of a high voltage rectifier element according to the present invention.

The characteristic of the second rectifier element $D_2$ will be described in more detail with reference to FIG. 4 showing the current waveform in FIG. 3*e* in on enlarged scale. The solid curve in FIG. 4 represents the characteristic of the rectifier element $D_2$ used in the present invention, while the dotted curve represents that of a conventional rectifier element. It will be seen from FIG. 4 that the rectifier element $D_2$ used in the present invention is featured by the fact that its recovery current $I_r$ during reverse recovery is smaller than that of the conventional rectifier element. This means that the peak $I_{rp}$ of the reverse recovery current $I_r$ is lower than that of the conventional rectifier element thereby shortening the reverse recovery time $t_{rr}$. Thus, the occurrence of undesirable noises can be reduced to a minimum. It is considered that the occurrence of undesirable noises is also attributable to the sharp rising waveform of the forward current $I_f$ charging the capacitors in addition to the occurrence due to the reverse recovery current $I_r$. The fact that a rectifier element having an improved reverse recovery characteristic can be used in the device means the fact that such a rectifier element may have a poor forward recovery characteristic. Thus, the peak $I_{fp}$ of the forward current $I_f$ in such rectifier element is fairly low thereby minimizing the occurrence of undesirable noises.

The improvement in the reverse recovery characteristic, which has affected adversely the operation of the cathode-ray tube during the starting of horizontal sweep in the television receiver, is advantageous in that the noise adversely affecting the quality of the picture being reproduced on the phosphor screen of the cathode-ray tube can thereby be eliminated. On the other hand, in the case of the rectifier element having a reduced reverse recovery time and smaller reverse recovery current, a large reverse leakage current appears during the application of reverse voltage. Referring to FIG. 3 again, the first and third rectifier elements $D_1$ and $D_3$ operate with the same current and voltage waveforms, while the second rectifier element $D_2$ operates with different current and voltage waveforms and the reverse voltage is applied to the second rectifier element $D_2$ during a period of time which is shorter than those for the first and third rectifier elements $D_1$ and $D_3$ as seen from the hatched portions in FIGS. *3b* and *3d*. This means that the means loss owing to heat produced by the reverse leakage current appearing during the application of the reverse voltage is less in the case of the second rectifier element $D_2$ than in the case of the first and third rectifier elements $D_1$ and $D_3$. In other words, the second rectifier element $D_2$ may be an element which can operate with a larger reverse leakage current than the first and third rectifier elements $D_1$ and $D_3$ provided that the first, second and third rectifier elements $D_1$, $D_2$ and $D_3$ produce heat of the same means value.

It will be seen from the above description that the second rectifier element $D_2$ in the voltage multiplying rectifier device according to the present invention is one which is featured, on one hand, by an improved reverse recovery characteristic, and on the other hand, by a large reverse leakage current. While the instantaneous loss due to heat produced in the second rectifier element $D_2$ is relatively large, the mean loss due to heat produced in the second rectifier element $D_2$ is at least equivalent to or less than that in the first and third rectifier elements $D_1$ and $D_3$ so that the undesirable noise can be eliminated without impairing the operating characteristics of the entire voltage multiplying rectifier device comprising the first, second and third rectifier elements $D_1$, $D_2$ and $D_3$.

One of the important characteristics of voltage multiplying rectifier devices for supplying a high voltage to cathode-ray tube is the critical operating temperature. In the vicinity of this critical temperature, the reverse leakage current, reverse recovery time and reverse recovery current are increased and the loss due to heat is abruptly increased resulting in thermal breakdown. Therefore, minimization of the loss due to heat produced in rectifier elements is one of the means for ensuring operation at a higher critical temperature. Typical of the losses due to heat produced in silicon rectifier elements constituting such a device are the loss due to the reverse leakage current appearing in response to the application of reverse voltage and the loss due to the reverse recovery current appearing during the application of reverse voltage from the forward direction.

Figure 5:
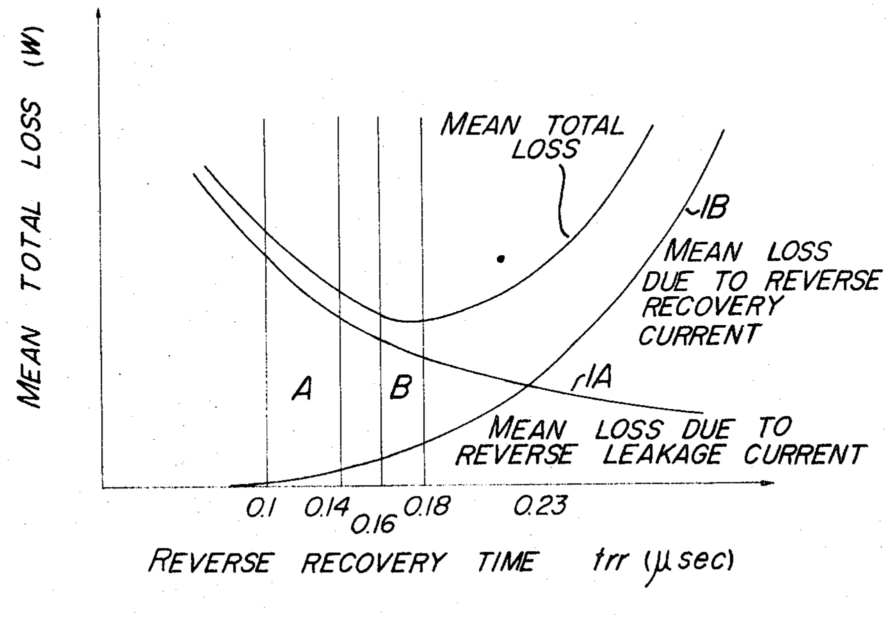
FIG. 5 is a graphic illustration of the loss due to heat produced in the high voltage rectifier element.
Figure 6A:
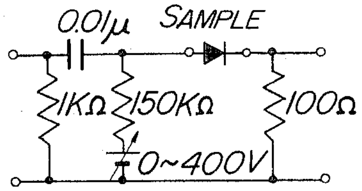
FIG. 6 is a circuit diagram of a circuit used for the measurement of the reverse recovery time of the high voltage rectifier element.
Figure 6A:
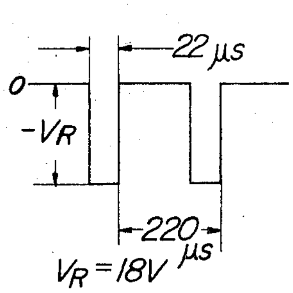
Figure 6C:
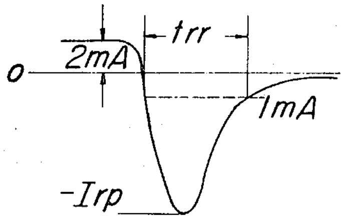

The relation between the reverse recovery time $t_{rr}$ and the losses referred to above will now be discussed. As is commonly known, in an element in which a heavy metal such as gold is diffused to control the reverse recovery characteristics thereof, a shorter reverse recovery time results in a smaller reverse recovery current but in a larger reverse leakage current. Thus, the loss due to the reverse recovery current and the loss due to the reverse leakage current relative to the reverse recovery time are contrary to each other in that an increase in the former results in a decrease in the latter, and vice versa. FIG. 5 shows these losses relative to the reverse recovery time measured on a practical element. In designing the rectifier elements for use in a voltage multiplying rectifier device for supplying a high voltage to a cathode-ray tube, the odd-numbered rectifier elements, such as the first and third rectifier elements or the first, third and fifth rectifier elements, are preferably designed to operate with a minimum loss and especially their reverse recovery time $t_{rr}$ is preferably selected to be most suitable for the purpose. The desired reverse recovery time $t_{rr}$ can be obtained by suitably controlling the diffusion temperature of the heavy metal such as gold. According to the present invention, the reverse recovery time $t_{rr}$ of the first and third rectifier elements $D_1$ and $D_3$ is selected to lie within the range of 0.16 to 0.18 $\mu s$ as seen at B in FIG. 5 in order that it provides a minimum mean total loss which is the sum of the mean loss due to the reverse leakage current and the mean loss due to the reverse recovery current. This range has been proved optimum in the actual evaluation of critical operating temperatures. Explanation of the measurement of the reverse recovery time $t_{rr}$ will now be made taken in conjunction with FIGS. 6(*a*) to 6(*c*). FIG. 6(*a*) shows a circuit for measuring the reverse recovery time. The voltage shown by the waveform of FIG. 6(*b*) is applied to the input terminals of the circuit and from the output terminals thereof there is obtained the output voltage shown by the waveform of FIG. 6(*c*) by which the reverse recovery time $t_{rr}$ is measured.

In the case of the even-numbered rectifier elements such as the second rectifier element $D_2$, the reverse recovery time $t_{rr}$ thereof may or may not lie within the range of 0.16 to 0.18 $\mu s$ above specified due to the fact that less heat is produced therein. However, with a view to eliminating the undesirable noise, the reverse recovery time $t_{rr}$ is selected to be less than that for the first and third rectifier elements $D_1$ and $D_3$ thereby lowering the peak of the reverse recovery current in the reverse recovery time and dulling the rising waveform of the forward current. In the case of the present invention, the maximum value of $t_{rr}$ in the second rectifier element $D_2$ is selected to be 0.14 $\mu s$ in view of the noise and the minimum value of $t_{rr}$ is limited to about 0.1 $\mu s$ in view of the loss due to heat as seen at A in FIG. 5.

Figure 7A:
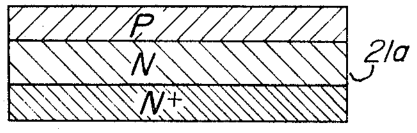
FIGS. 7*a* and 7*b* are schematic sectional views of a silicon rectifier element preferably used in the present invention.
Figure 7B:
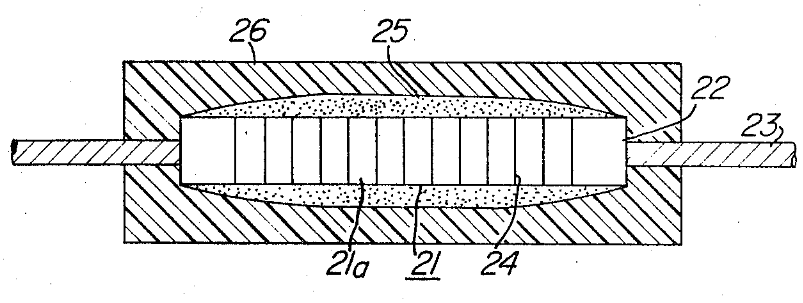

A preferred form of the silicon rectifier element used in the voltage multiplying rectifier device according to the present invention is shown in FIG. 7. Referring to FIG. *7a*, the reference numeral 21a designates a diode which consists of an $n^+$-type layer of high impurity concentration, an intermediate n-type layer and a p-type layer doped with gold. Any other suitable heavy metal such as, copper, manganese, indium, nickel or zinc may be used in lieu of gold. Referring to FIG. *7b*, the reference numeral 21 designates a rectifier unit which is composed of a plurality of such diodes 21a which are connected in series and are held between a pair of electrodes 22 of metal such as tungsten or molybdenum. A pair of conductive leads 23 extend from the opposite electrodes 22. An aluminum solder 24 is used to firmly bond the diodes 21a together and the diodes 21a to the electrodes 22. A layer of an electrical insulator 25 such as silicon rubber or varnish covers the p-n junctions exposed at the opposite surfaces of the rectifier unit 21. The rectifier unit 21 covered with the insulator layer 25 is bodily enclosed in a block of an electrical insulator 26 such as an epoxy resin or silicon resin.

A plurality of such silicon rectifier elements are used in the voltage multiplying rectifier device shown in FIG. 1. In order that the second rectifier element $D_2$ has an improved reverse recovery characteristic over the first and third rectifier elements $D_1$ and $D_3$, it is doped with a larger amount of a heavy metal such as gold, or the heavy metal is diffused at a higher temperature, or the heavy metal is diffused over a longer period of time. In lieu of doping with the heavy meatal, the intermediate n-type layer in the diodes 21*a* constituting the second rectifier element $D_2$ may have a larger thickness than the remaining layers, or the diodes 21*a* may have a larger surface area than those constituting the first and third rectifier elements $D_1$ and $D_3$ to attain the same effect.

It will be understood from the foregoing description that the present invention provides a voltage multiplying rectifier device for supplying a high voltage to a cathode-ray tube in a television receiver in which the second rectifier element among at least three silicon rectifier elements has an improved reverse recovery characteristic over the other thereby eliminating the trouble due to the noise produced by the silicon rectifier elements.

We claim:

1. A voltage multiplying rectifier device for supplying a high voltage to a cathode-ray tube comprising at least three semiconductor rectifiers connected in series between the output terminal of a flyback transformer and the high voltage terminal of the cathode-ray tube, a first voltage dividing capacitor connected in parallel with the two consecutive rectifiers counting from one end of the array of said series-connected rectifiers, and a second voltage dividing capacitor connected in parallel with the two consecutive rectifiers counting from the other end of the array of said series-connected rectifiers, wherein the even-numbered or second rectifier counting from the end connected to said flyback transformer has an improved reverse recovery characteristic over that of the odd-numbered or first and third rectifiers.

2. A voltage multiplying rectifier device as claimed in claim 1, in which the reverse recovery time and reverse recovery current of said second rectifier are less than those of said first and third rectifiers.

3. A voltage multiplying rectifier device as claimed in claim 1, in which said second rectifier is doped with a heavy metal in an amount larger than that for said first and third rectifiers so that it has the improved reverse recovery characteristic.

4. A voltage multiplying rectifier device as claimed in claim 1, in which the peak of the reverse recovery current of said second rectifier is lower than those of said first and third rectifiers.

5. A voltage multiplying rectifier device as claimed in claim 1, in which the peak of the forward current of said second rectifier is lower than those of said first and third rectifiers.

6. A voltage multiplying rectifier device as claimed in claim 1, in which the semiconductor element constituting said second rectifier is composed of a first layer, a second layer of a conductivity type opposite to that of said first layer, and a high-doped third layer of the same conductivity type as that of said second layer, and the thickness of said second layer is larger than those of said first and third layers.

7. A voltage multiplying rectifier device as claimed in claim 1, in which the semiconductor element constituting said second rectifier has a surface area larger than those of said first and third rectifiers.

8. A voltage multiplying rectifier device as claimed in claim 1, wherein each of said semiconductor rectifiers is a silicon rectifier.

9. A voltage multiplying rectifier device as claimed in claim 2, wherein each of said semiconductor rectifiers is a silicon rectifier.

10. A voltage multiplying rectifier device as claimed in claim 3, wherein each of said semiconductor rectifiers is a silicon rectifier.

11. A voltage multiplying rectifier device as claimed in claim 4, wherein each of said semiconductor rectifiers is a silicon rectifier.

12. A voltage multiplying rectifier device as claimed in claim 5, wherein each of said semiconductor rectifiers is a silicon rectifier.

13. A voltage multiplying rectifier device as claimed in claim 6, wherein each of said semiconductor rectifiers is a silicon rectifier and the semiconductor element constituting said second rectifier is silicon.

14. A voltage multiplying rectifier device as claimed in claim 7, wherein each of said semiconductor rectifiers is a silicon rectifier and the semiconductor element constituting said second rectifier is silicon.

15. A voltage multiplying rectifier device for supplying a high voltage to a cathode-ray tube comprising an odd number (except one) of semiconductor rectifiers connected in series between the output terminal of a flyback transformer and the high voltage terminal of the cathode-ray tube, first voltage dividing capacitors connected in parallel with the successive sets of two consecutive rectifiers counting from one end of the array of said series-connected rectifiers, and second voltage dividing capacitors connected in parallel with the successive sets of two consecutive rectifiers counting from the other end of the array of said series-connected rectifiers, wherein the even-numbered rectifiers counting from the end connected to said flyback transformer have an improved reverse recovery characteristic over that of the odd-numbered rectifiers.

16. A voltage multiplying rectifier device as claimed in claim 8, wherein each of said semiconductor rectifiers is a silicon rectifier.

* * * * *